US012027021B2

(12) United States Patent
Nelson et al.

(10) Patent No.: US 12,027,021 B2
(45) Date of Patent: Jul. 2, 2024

(54) METHODS FOR SOCIAL MONETARY GIVING IN THE GAMING ENVIRONMENT

(71) Applicant: IGT, Las Vegas, NV (US)

(72) Inventors: Dwayne Nelson, Las Vegas, NV (US); Cameron Filipour, Las Vegas, NV (US); Kevin Higgins, Reno, NV (US)

(73) Assignee: IGT, Las Vegas, NV (US)

(*) Notice: Subject to any disclaimer, the term of this patent is extended or adjusted under 35 U.S.C. 154(b) by 4 days.

(21) Appl. No.: 17/706,060

(22) Filed: Mar. 28, 2022

(65) Prior Publication Data

US 2022/0215724 A1 Jul. 7, 2022

Related U.S. Application Data

(62) Division of application No. 16/277,363, filed on Feb. 15, 2019, now Pat. No. 11,302,150.

(51) Int. Cl.
*G07F 17/32* (2006.01)

(52) U.S. Cl.
CPC ...... *G07F 17/3288* (2013.01); *G07F 17/3223* (2013.01); *G07F 17/3225* (2013.01); *G07F 17/3244* (2013.01)

(58) Field of Classification Search
CPC ............. G07F 17/3223; G07F 17/3225; G07F 17/3244; G07F 17/3288
See application file for complete search history.

(56) References Cited

U.S. PATENT DOCUMENTS

| | | | |
|---|---|---|---|
| 7,980,948 B2 | 7/2011 | Rowe et al. | |
| 10,937,271 B2 | 3/2021 | Malek | |
| 10,950,081 B2 | 3/2021 | Baker et al. | |
| 10,984,633 B2 | 4/2021 | Malek | |
| 11,080,967 B2 | 8/2021 | Higgins et al. | |
| 11,087,584 B2 | 8/2021 | Nelson et al. | |
| 11,145,168 B2 | 10/2021 | Filipour, Jr. et al. | |
| 11,302,150 B2 * | 4/2022 | Nelson | G07F 17/3225 |
| 2002/0094869 A1 | 7/2002 | Harkham | |
| 2008/0146344 A1 * | 6/2008 | Rowe | G07F 17/32 463/42 |
| 2009/0325686 A1 | 12/2009 | Davis et al. | |

(Continued)

OTHER PUBLICATIONS

Official Action for U.S. Appl. No. 16/277,363, dated Jun. 26, 2020 6 pages Restriction Requirement.

(Continued)

*Primary Examiner* — William H McCulloch, Jr.
*Assistant Examiner* — William H McCulloch
(74) *Attorney, Agent, or Firm* — Sheridan Ross P.C.

(57) ABSTRACT

The present disclosure relates generally to a gaming system conducting a streaming session with a plurality of viewer systems through a streaming system. Conducting of the streaming session can comprise receiving media content from a plurality of input devices and providing the media content and game play information of a gambling event to the streaming system. During the streaming session, an indication of an action by a user of one of the viewer systems and indicating a transfer of value from the user of the one of the viewer systems to a participant in the gambling event associated with the gaming system can be received. An indication of the action by the user of the one of the viewer systems can be provided to the participant in the gambling event.

20 Claims, 6 Drawing Sheets

(56) References Cited

U.S. PATENT DOCUMENTS

| | | | | |
|---|---|---|---|---|
| 2018/0089961 | A1* | 3/2018 | Filipour, Jr. | G07F 17/3248 |
| 2019/0147703 | A1* | 5/2019 | Malek | G07F 17/3227 463/20 |
| 2019/0304249 | A1* | 10/2019 | Malek | G07F 17/323 |
| 2020/0043293 | A1 | 2/2020 | Nelson et al. | |
| 2020/0265685 | A1* | 8/2020 | Nelson | G07F 17/3244 |
| 2021/0201622 | A1 | 7/2021 | Baker et al. | |
| 2021/0241583 | A1 | 8/2021 | Malek | |

OTHER PUBLICATIONS

Official Action for U.S. Appl. No. 16/277,363, dated Apr. 14, 2021 13 pages.
Official Action for U.S. Appl. No. 16/277,363, dated Aug. 12, 2021 14 pages.
Notice of Allowance for U.S. Appl. No. 16/277,363, dated Dec. 22, 2021 9 pages.

* cited by examiner

METHODS FOR SOCIAL MONETARY GIVING IN THE GAMING ENVIRONMENT

CROSS REFERENCE TO RELATED APPLICATIONS

The present application claims the benefit of and is a Divisional to U.S. application Ser. No. 16/277,363, filed on Feb. 15, 2019, entitled "METHODS FOR SOCIAL MONETARY GIVING IN THE GAMING ENVIRONMENT," the entire disclosure of which is hereby incorporated herein by reference, in its entirety, for all that it teaches and for all purposes.

BACKGROUND

Embodiments of the present disclosure relate generally to online streaming sessions and more particularly to live streaming of video, audio and/or other media between a player of a gambling machine or game and a set of viewers in which the viewers and player can interact and the viewers can participate.

Live streaming is a popular concept for various online games, which allows gamers to stream their game play to various online services such as Twitch.tv and YouTube where interested viewers can watch, chat, and generally be a part of the action. The live streaming category has proven to be very popular online.

BRIEF SUMMARY

In certain embodiments, the present disclosure relates to a gaming system comprising a display, a plurality of input devices, a communications interface, a processor coupled with each of the display, the plurality of input devices, and the communications interface, and a memory coupled with and readable by the processor. The memory can have stored therein a set of instructions which, when executed by the processor, causes the processor to conduct, through the communications interface, a streaming session with a plurality of viewer systems through a streaming system. Conducting of the streaming session can comprise receiving media content from the plurality of input devices and providing the media content and game play information of a gambling event to the streaming system. The instructions can further cause the processor to receive, through the communications interface, during the conducting of the streaming session, an indication of an action by a user of one of the viewer systems. The action can indicate a transfer of value from an electronic record associated with the user of the one of the viewer systems to an electronic record associated with a participant in the gambling event and associated with the gaming system. The instructions can further cause the processor to provide, through the display, an indication of the action by the user of the one of the viewer systems and the transfer of value from the electronic record associated with the user of the one of the viewer systems to the electronic record associated with the participant in the gambling event.

According to another embodiment, a streaming system can comprise a communications interface, a processor coupled with the communications interface, and a memory coupled with the processor. The memory can store therein a set of instructions which, when executed by the processor, causes the processor to establish, through the communications interface, a streaming session between a first gaming system and a plurality of viewer systems. The streaming session can comprise an exchange of media between the first gaming system and the plurality of viewer systems. The instructions can further cause the processor to receive, through the communications interface, from the first gaming system during the streaming session, game play information of a gambling event, provide, through the communications interface, the game play information to the plurality of viewer systems, and receive, through the communications interface, during the streaming session an indication of an action by a user of one of the viewer systems. The action can indicate a transfer of value from an electronic record associated with the user of the one of the viewer systems to an electronic record associated with a user of the first gaming system. The user of the first gaming system can comprise a participant in the gambling event. The instructions can further cause the processor to provide, through the communications interface, to the first gaming system, an indication of the action by the user of the one of the viewer systems.

According to yet another embodiment, a method for conducting a streaming session related to a gambling event, the method can comprise receiving, by a streaming system through a communications network, a request from an Electronic Gaming Machine (EGM) to initiate the streaming session and sending, by the streaming system through the communications network, a message to each of a plurality of viewer systems. The message can comprise a notification of initiation of the streaming session. The method can further comprise receiving, by the streaming system, from a viewer system of the plurality of viewer systems, a message requesting participation in the streaming session and establishing, by the streaming system, the streaming session between the EGM and the viewer system. The streaming session can comprise an exchange of media between the EGM and the viewer system and game play information of a game executing on the EGM. The method can further comprise receiving, by the streaming system through the communications network and during the streaming session, an indication of an action by a user of one of the viewer systems and providing, by the streaming system through the communications network, to a first gaming system, an indication of the action by the user of one of the viewer systems.

Additional features and advantages are described herein and will be apparent from the following Description and the figures.

DETAILED DESCRIPTION

Embodiments of the present disclosure will be described in connection with a live streaming of video, audio and/or other media between a player of a gambling machine or game and a set of viewers in which the viewers and player can interact and the viewers can participate monetarily. More specifically, a gaming system at a casino can capture audio and/or video of a player at the gaming system as well as game play information for a game in which the player is participating. The captured video, audio, and/or other media can be combined with the game play information and published by the gaming system in a live stream to a streaming system. A set of viewers can then access the streaming system to watch the stream and interact with the player. For example, the viewers can participate in a chat session with the player. In other cases, the viewers may additionally or alternatively be able to participate monetarily using virtual or real currency, for example, by contributing funds to the player, participating in back betting on the game being played in the session, etc. Other features and functions of various embodiments will be described herein.

Figure 1:
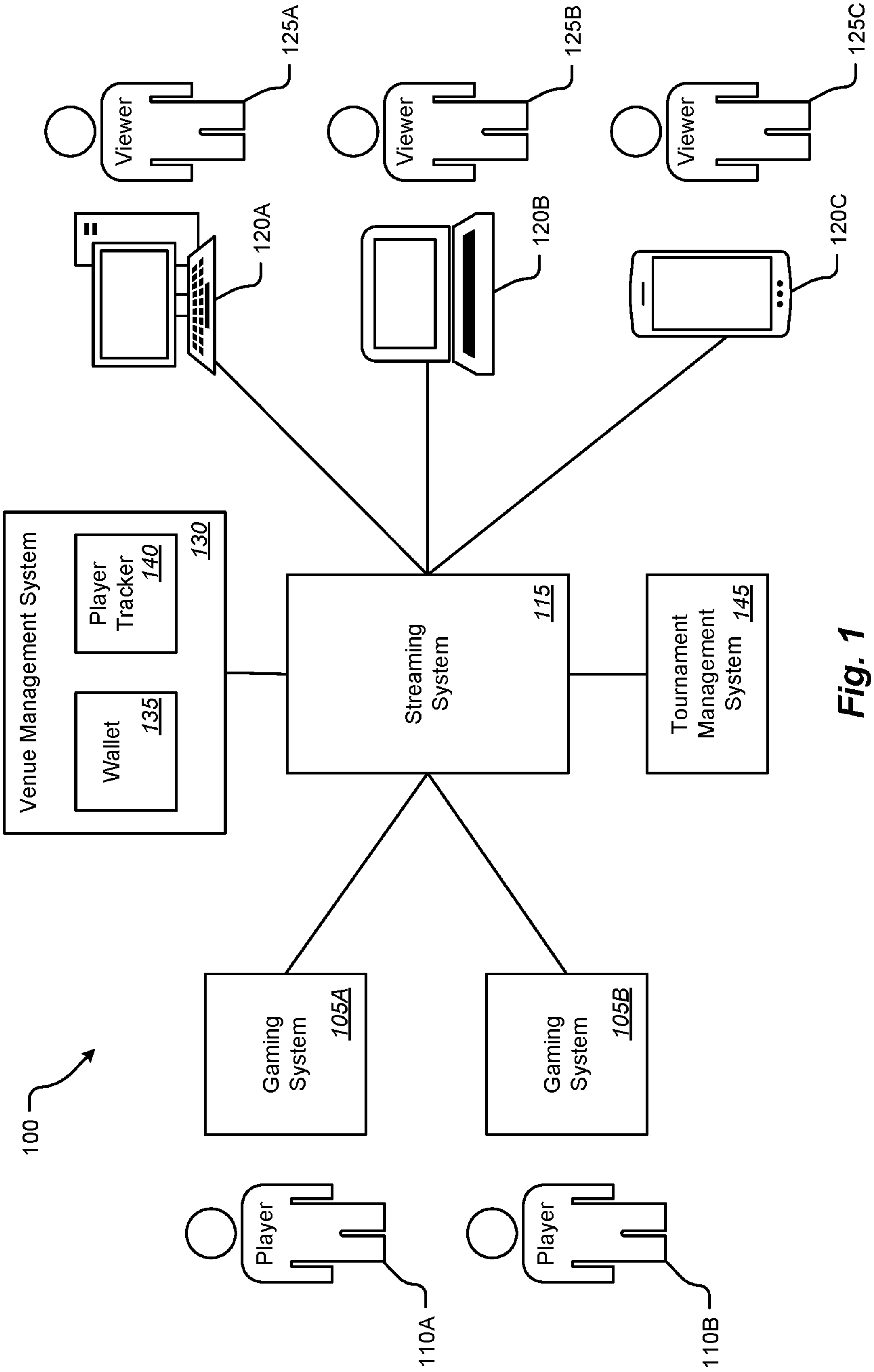
FIG. 1 is a block diagram illustrating an exemplary environment in which one or more embodiments of the present disclosure may be implemented.

FIG. 1 is a block diagram illustrating an exemplary environment in which one or more embodiments of the present disclosure may be implemented. As illustrated in this example, a system 100 can comprise one or more gaming systems 105A and 105B. The gaming systems 105A and 105B can comprise, for example, one or more Electronic Gaming Machines (EGMs) through which players 110A and 110B can play any of a variety of well-known casino games such as slots, video poker, bingo, etc. Additionally, or alternatively, the gaming systems 105A and 105B can comprise one or more Electronic Table Games (ETG) through which the players 110A and 110B can play electronic versions of common casino table games such as poker, blackjack, roulette, etc. In yet another case, either or both of the gaming systems 105A and 105B can additionally or alternatively comprise a sports betting kiosk or cabinet through which the players 110A and 110B can view sporting events and place wagers on those sporting events. According to one embodiment, the gaming systems 105A and 105B can either or both comprise some combination of these types of systems, e.g., a sports betting kiosk or EGT providing EGM casino games such as slots, video poker, etc. or other combinations.

As will be described in greater detail below, the gaming systems 105A and 105B can be equipped with input devices such as webcams or other cameras, microphones, etc. to capture audio and/or video of the player 110A and 110B and/or the game as it is being played. The gaming systems 105A and 105B can also store and execute software instructions that cause the gaming systems 105A and 105B to capture game play information for the game in which the player is participating, e.g., bets placed, current pot or prize amounts, etc. The software instructions can further cause the gaming systems 105A and 105B to combine the captured video, audio, and/or other media with the game play information into a live stream and publish the live stream to a streaming system 115 for broadcast. In other implementations, the video and/or audio may be captured and encoded by the streaming system 115 while the game is being played on the gaming systems 105A and 105B thereby offloading the overhead of capturing and encoding the video and/or audio stream from the gaming systems 105A and 105B.

The streaming system 115 can comprise, for example, one or more web servers or other servers communicatively coupled with the gaming systems 105A and 105B via one or more communications networks (not shown here) such as one or more wired and/or wireless Local Area Networks (LANs), Wide Area Networks (WANs), the Internet, etc. Generally speaking, the streaming system 115 can store and execute a set of software instructions which cause the streaming system 115 to receive the stream published by the gaming systems 105A and 105B and make the stream available to other users. For example, the system 100 can further comprise a set of viewer systems 102A, 120B, and 120C communicatively coupled with the streaming system 115 via one or more communications networks (not shown here) such as one or more LANs, WANs, the Internet, etc. The viewer system 120A, 120B, and 120C can comprise any of a variety of possible computing devices including, but not limited to, a desktop computer 120A, a laptop computer 120B, a mobile device 120C such as a smartphone, tablet, etc., or other similar devices.

Through the viewer systems 120A, 120B, and 120C, a set of viewers 125A, 125B, and 125C can then access the streaming system 115 to watch the stream from one or more of the gaming systems 105A and 105B and interact with one or more of the players 110A and 110B. For example, the streaming system 115 can provide video and/or text-based chat which the viewers 125A, 125B, and 125C can use participate in a chat session with one or more players 105A and 105B during the streaming session. That is, through the gaming systems 105A and 105B, streaming system 115 and viewer systems 120A, 120B, and 120C, the viewers can receive and watch the video, audio, and/or other media of the stream and view the game play information to watch and listen to the players 110A and/or 110B while viewing the game as it progresses. Through the viewer systems 120A, 120B, and 120C, the streaming system 115, and the gaming systems 105A and 105B, the viewers can also interact with the players 110A and/or 110B at the same time, e.g., through video and/or text-based chat.

The system 100 can also include a venue management system 130, such as a casino management system 115 communicatively coupled with the streaming system 115 through one or more communications networks (not shown here) such as one or more LANs, WANs, the Internet, etc. While not shown here, the venue management system may additionally or alternatively be communicatively coupled with the gaming systems 105A and 105N through one or more communications networks (not shown here). Generally speaking, the venue management system 130 can comprise one or more servers and/or other computing devices storing and executing software instructions for monitoring, tracking, and managing various assets of the venue such as the gaming systems 105A and 105B, for example. Among the software instructions executed by the venue management system 130 can be instructions causing the venue management system 130 to maintain an electronic wallet 135 for each player 110A and 110B. As known in the art, this electronic wallet 135 can represent an account of the player 110A and 110B and can store information indicating real or virtual currency available for game play and/or withdrawal by the player 110A and 110B.

According to one embodiment, viewers 125A, 125B, and 125C can participate and interact with players 110A and 110B by contributing money, real or virtual, which can then be credited to the electronic wallet 135 associated with a player 110A or 110B. As will be described in greater detail below, this contribution can take many different forms under a variety of different models. In any of these cases, the streaming system 115 can receive a message from a viewer system 120A indicating a viewer 125A using that system 120A wishes to donate, gift, or otherwise contribute some monetary value to a particular player 110A. The streaming system 115 can pass this request to the venue management system 130 which can in turn affect the transfer according to processes as known in the art. For example, the transfer may comprise a transfer of value from an electronic record associated with the viewer 125A, e.g., a credit card account, electronic wallet, bank account, etc., to an electronic record associated with the player 110A, e.g., the electronic wallet account for the player. This transfer may occur at or near the time of the request or at a later time, for example, depending upon the outcome of the current game. In either case, the streaming system 115 can also send a message to the player 110A to whom the transfer was made through the gaming system 105A that player 110A is using which can, in turn, present a notification in the user interface to the player 110A so that the player 110A is aware of the transfer. The player 110A may then thank the viewer 125A making the contribution, donation, or gift or otherwise acknowledge the transfer.

As illustrated here and according to one embodiment, the venue management system 130 can additionally or alternatively comprise software instructions which, when executed, can cause the venue management system 130 to perform various player tracking functions 140. The player tracking functions 140 can comprise tracking the play of a player 110A to determine how they are performing in relation to other players 110B. Additionally, or alternatively, the player tracking functions 140 can comprise tracking contributions, donations, gifts, or other transfers from the viewers 125A, 125B, and 125C to the players 110A and 110B.

According to one embodiment, the system 100 can also include a tournament management system 145. In some cases, a single player 110A playing a single game at a single gaming system 105A can interact with one or more viewers 125A, 125B, and/or 125C, i.e., one gaming system 105A publishes a stream to the streaming system 115 that is distributed to one or more viewer systems 120A, 120B, and/or 120C. In other cases, more than one player 110A and 110B and/or more than one gaming system 105A and/or 105B can be joined together into a tournament by the tournament management system 145. In such cases, the tournament management system 145 can identify and manage game play between the gaming systems 105A and 105B and/or players 110A and 110B and the streaming system 115 can combine the streams from the gaming systems 105A and 105B or otherwise made the different streams available to the viewer systems 120A, 120B, and 120C.

In use, the gaming system 105A and 105B connects to and allows the player 110A and 110B to login to the streaming system 115, captures frames from its screen during game play, encodes the captured frames using a video compression algorithm, and uploads them to the player's 110A or 110B stream in the streaming system. Before the captured data is encoded by the gaming system 105A and 105B, additional aspects of the image may be adjusted based upon configuration. For example, overlays may be added to the video stream that describe game play information. This game play information can comprise, for example, details about the player's session or period of time including, but not limited to, largest win in the session, session duration, amount bet for the session, amount won for the session, jackpots won for the session, etc. Other game play information captured and encoded into the stream can include, but is not limited to, achievements, number of viewers, gifts sent to the player by a viewer, e.g., total and/or individual gifts as they occur, contributions to a charity from a viewer on behalf of a player, e.g., total and/or individual contributions as they occur, etc. Details about a tournament a player is in, can also be captured and encoded into the stream including, but not limited to wagers for the tournament, wins for the tournament, current standing in the tournament, etc.

Game outcome data may also be published by the gaming systems 105A and 105B to the streaming system 115. This data can be used by the streaming system 115 to perform a variety of activities including, but not limited to, recording historical play statistics for a player, capturing and saving video streams surrounding large wins or jackpots, win streaks, tracking the play of a player to determine how they are performing in relation to other players etc. Game outcome data may also be used for the purposes of building an achievement system, where players can earn achievements on the streaming system 115 for their play, such as badges, avatars, access to emojis, prizes, e.g., cash or physical goods, etc. At the most basic level, game outcome data can consist of the wager and the win, i.e., zero or above, but more detailed data can be sent as well. For example, outcome data for a hand of video poker can describe the hand dealt, the cards held, and the final hand.

Since the gaming systems 105A and 105B encodes the video stream, activities occurring on the streaming system can be sent to the gaming systems 105A and 105B to update any graphical elements rendered in the video stream. For example, if a viewer 125A sends a gift to a player 110A, the streaming system can generate an award message and either send that to the gaming systems 105A and 105B, or the gaming systems 105A and 105B can actively poll the streaming system 115 for notification messages. Upon receipt of a notification message, the gaming systems 105A and 105B can act upon the notification. This can include displaying a notification on the gaming systems 105A and 105B screen that only the player 110A and 110B at the gaming systems 105A and 105B can see. It can also result in the rendering of one or more notifications onto the game itself. In other cases, it could additionally or alternatively result in the rendering of one or more notifications into the video stream, which can be viewable by online viewers 125A, 125B, and 125C but may not be seen by the player 110A and 110B at the gaming systems 105A and 105B.

According to one embodiment, the players 110A and/or 110B can connect peripherals to the gaming systems 105A and 105B to further enhance the broadcasting experience. One example of such a peripheral can be a headset which provides a microphone so the player can speak to the viewers 125A, 125B, and 125C. The headset may be a wired or wireless headset. If wired, it may connect to the gaming systems 105A and 105B over USB Audio, standard analog headphone and speaker jacks, or optical inputs and outputs. If wireless, the headset may connect to the gaming systems 105A and 105B over Bluetooth or other wireless protocol. The gaming systems 105A and 105B may also provide one or more USB power outlets to drive peripherals provided by the player, such as a wireless base station for gaming quality headphones.

The gaming systems 105A and 105B may detect when headphones are connected and mute the gaming systems' 105A and 105B native speakers and route all output to the headphones so that the risk of echo when the player is speaking into their headphone microphone is minimized, but portions of the gaming systems 105A and 105B speakers may still play sound on key events, such as large jackpots, during certain in-game bonuses, etc., in order to still have the EGM or ETG contribute to the general ambiance of the casino for exciting events.

Online viewers 125A, 125B, and 125C may be able to view a player's 110A and/or 110B live stream, or they may pay a required or optional fee, e.g., daily, weekly, monthly, yearly, etc., to view the live stream, or participate in some live chat. If viewers 125A, 125B, and 125C are required to pay to fully participate in the stream, then some percentage of that may be transferred and credited to the player 110A or 110B, e.g., through the electronic wallet 135 for the player 110A or 110B maintained by the venue management system 130. Some percentage of that fee may also be shared with the casino that the player 110A or 110B plays at and if the player 110A or 110B has played at multiple casinos, then the fee may be split amongst those casinos based upon a reasonable formula based upon hours played, coin-in, etc. The operator of the streaming system 115, if different from the casino, may also take a percentage of subscription revenue.

According to one embodiment, viewers 125A, 125B, and 125C can send monetary gifts to players 110A and 110B as a virtual "thank you" for playing well, or performing some action requested by a viewer. These gifts can be funded by electronic credits that viewers establish with the streaming system 115. In one embodiment, these gifts can be transferred to an account established for the player 110A and 110B in the streaming system 115. In another embodiment, these credits can be transferred to a cashless wagering system that the player has established at a participating casino, e.g., the electronic wallet 135 maintained by the venue management system 130. In another embodiment, these credits can be directly transferred to a credit meter of the gaming system 105A or 105B for use in future wagers. These transfers to the gaming system 105A or 105B can be recorded using the existing wagering account transfer or bonus meters tracked by the gaming system 105A or 105B, or alternatively, specific meters can be added to the gaming system 105A or 105B to track external gifts to the gaming system 105A or 105B credit meter. For example, online viewers 125A, 125B, and/or 125C may congratulate a player 110A for earning a royal flush in a poker game by gifting him $20. Alternatively, an online viewer 125A may request, through an online chat, that the player 110A hold certain cards in a poker hand by gifting the player 110A some amount of money. In yet another example, a viewer 125A can give the player 110A a certain win, e.g., the viewer 125A might give the player 110A a "flush" in poker and that might cost $40 if the payment for flush, at the current configuration, is $40. Additionally, or alternatively, viewers 110A and 110B can contribute money to a pot or pool which can increase until, at some point, it gives the player 110A a pay table win. For example, 10 viewers may give a total of $100 to the player 110A. If, in the current configuration, $95 is the win for four-cherries on a slot game being played on the gaming system 105A, the player can be awarded a four-cherry win based on the $100 pot. In other words, casino game wins can be awarded as the prize instead of directly transferring money to the player. This can work especially well for a progressive win since viewers can contribute to the pool, which is a progressive pool, and at some point the pool can be awarded to the player.

According to one embodiment, online viewers 125A, 125B, and 125C who are located in jurisdictions where online gambling is legalized, can place back-bets on play performed by the player. In one embodiment, an online viewer 125A can establish an online wagering account with the streaming system 115 and pre-fund the account with credits. Then, after joining or subscribing to a live stream or channel of a player 110A, the online viewer 125A can elect to place a bet equaling the bet placed by the player 110A, as long as the viewer's associated streaming system 115 account has enough credits to fund the bet. If the player 110A does not win a game cycle or wager, then the online viewer 125A also loses. If the player 110A wins, then any viewer 125A who was betting along with the player 110A can also win the same amount. In other cases, some percentage of the viewer's 125A win can be automatically shared with or gifted to the player 110A.

As noted above, the tournament management system 145 can allow multiple players 110A and 110B to play in a casino tournament game where the players 110A and 110B compete to determine who will win the tournament. One or more players 110A and/or 110B in the tournament may choose to stream their play live using the streaming system 115. In such a configuration, the streaming system 115 and/or tournament management system 145 can track the score of the gaming systems 105A and 105B that are participating in the tournament. The streaming system 115 can use the data published by the tournament system 145 to display leaderboards of various types, including, for example, the current leaderboard and/or the current player's position on the overall leaderboard. According to one embodiment, gifts given to players 110A and 110B participating in a tournament by viewers 125A. 125B, and/or 125C can impact a player's position in the tournament. For example, if a player 110A has a credit meter balance of $1000 after one minute of play, and they are currently ranked third on the leaderboard, and an online viewer 125A gifts that player 110A $200, then the player 110A may jump into first place on the leaderboard. Additionally, or alternatively, online viewers 125A. 125B, and 125C may be able to place wagers on which player 110A or 110B may win a tournament. If an online viewer 125A correctly picks the winning player 110A, then the wagers posted by losing online viewers 125B and 125C, minus some rake, can be paid to the winning viewer 125A (or viewers).

According to one embodiment, the gaming system 105A and/or 105B broadcasting a stream may encode in the stream an advertisement for the casino or venue in which the gaming system 105A and/or 105B is located. For example, when rendered on the viewer system 120A, the base game may be surrounded by a logo or advertisement from the casino. In another approach, the advertisement may be provided to and displayed on the viewer system 120A separate from the streaming video. In either case, the advertisement might offer players discounts, free points, or free promotional credits at the casino for signing up for a visit to the casino. Additionally, or alternatively, the advertisement can offer viewers 125A, 125B, and/or 12C who associate their account with the streaming system 115 to a casino player tracking account various privileges based upon how much they watch, how many gifts they give players, or how many back-bets they place. For example, players can earn points, promotional credits, comps, etc. based upon how much play they view that is broadcast from that casino. Such promotions can be funded by a casino if the casino that is hosting the player gets a percentage of the subscriptions to a player's channel, gifts, and/or back-bets or a percentage of the hold associated with back-bets.

According to one embedment, players 110A and 110B can also be able to place wagers on sporting events through the gaming system 105A and 105B and have information about their bets broadcast in the stream. For example, details for each sports wager placed may be published by the gaming system 105A and/or a sports betting system (not shown here) to the streaming system 115 to keep track of the sports wagering performance of the player 110A. As the events associated with a sports wager occur or finalize, the results of the wager may be reported to the streaming system 115 by the gaming system 105A or the sports betting system. This allows the streaming system 115 to update player statistics and possibly award the player 110A any achievements. Back-betting by viewers 125A, 125B, and 125C in certain jurisdictions may also be possible, so the streaming system 115 may also update win and loss records for back-bet sports bets placed by viewers 125A, 125B, and 125C.

Figure 2:
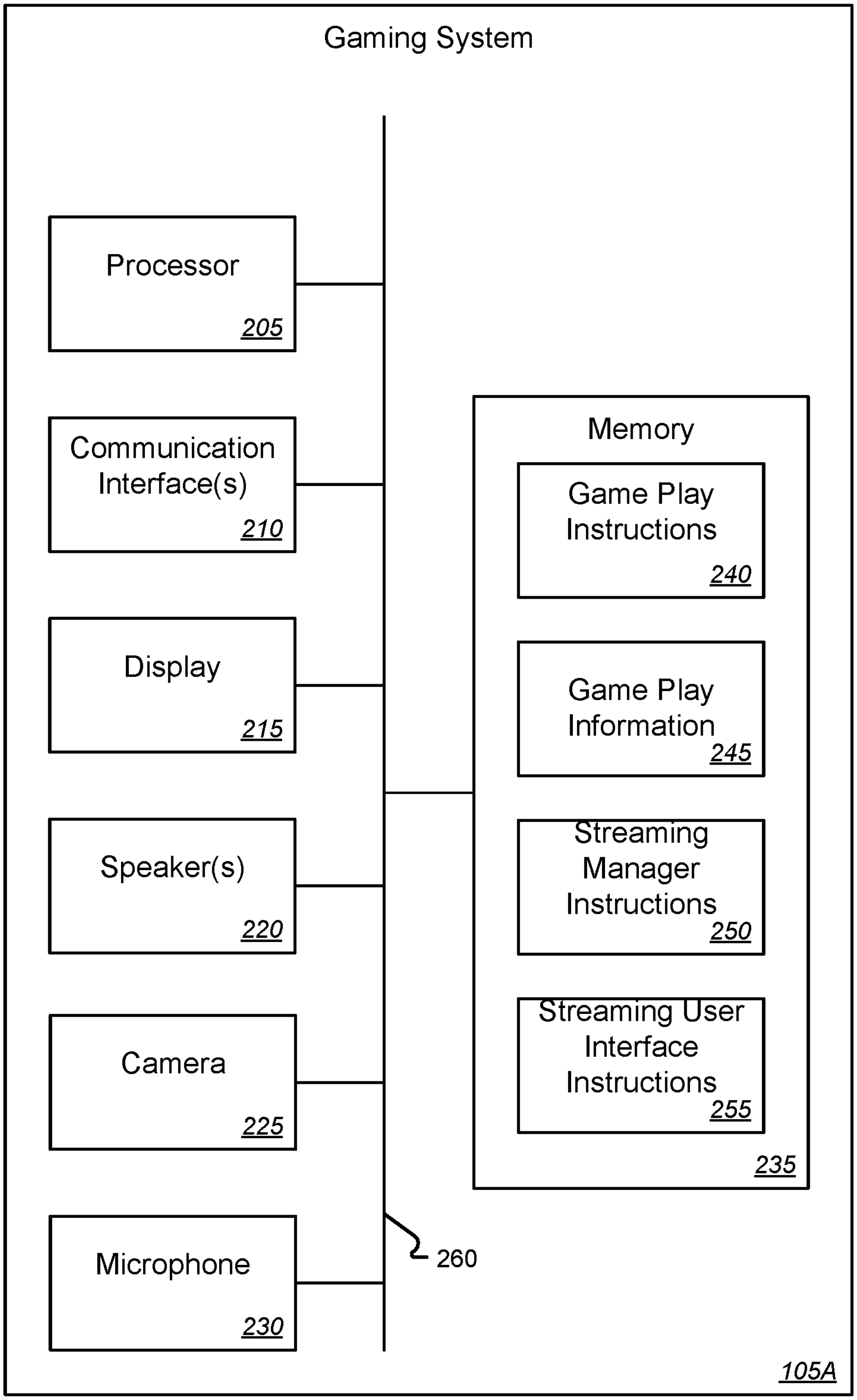
FIG. 2 is a block diagram illustrating additional details of an exemplary gaming system according to one embodiment of the present disclosure.

FIG. 2 is a block diagram illustrating additional details of an exemplary gaming system according to one embodiment of the present disclosure. As illustrated in this example, a gaming system 105A can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 235. Upon executing the instruction sets stored in memory 235, the processor 205 enables various functions of the gaming system 105A as described herein.

A memory 235 can be coupled with and readable by the processor 205 via a communications bus 260. The memory 235 may include any type of computer memory device or collection of computer memory devices. Non-limiting examples of memory 235 include Random Access Memory (RAM), Read Only Memory (ROM), flash memory, Electronically-Erasable Programmable ROM (EEPROM), Dynamic RAM (DRAM), etc. The memory 235 may be volatile or non-volatile in nature. The memory 235 may be configured to store the instruction sets depicted in addition to temporarily or permanently storing data for the processor 205 to execute various types of routines or functions.

The processor 205 can also be coupled with one or more communication interfaces 210 via the communications bus 260. The communication interfaces 210 can comprise, for example, any one or more of a variety of wired and/or wireless interfaces to one or more LANs and/or WANs, such as an Ethernet network, a Token-Ring network and/or the like, a virtual network, including without limitation a Virtual Private Network (VPN), the Internet, an intranet, an extranet, a Public Switched Telephone Network (PSTN), an infra-red network, a wireless network (e.g., a network operating under any of the IEEE 802.9 suite of protocols, the Bluetooth® protocol known in the art, and/or any other wireless protocol); and/or any combination of these and/or other networks.

The memory 235 can store therein sets of instructions which, when executed by the processor 205, cause the processor 205 to conduct live streaming of video, audio and/or other media related to a game being played on the gaming system 105A. More specifically, the memory 235 can store and the processor 205 can execute a set of game play instructions 240. When executed by the processor 205, the game play instructions 240 can cause the processor 205 to play a game such as slots, video poker, etc. and present output of that game through a display 215 and/or one or more speakers 220 of the gaming system 105A coupled with the processor 205 through the communications bus 260. The game play instructions 240 can also cause the processor 205 to maintain in the memory 235 a set of game play information 245 such as bets place, current pot or prize amounts, etc.

The memory 235 can also store, and the processor 205 can execute, a set of streaming manager instructions 250. When executed by the processor 205 the streaming manager instructions 250 can cause the processor 205 to conduct, through the communications interface(s) 210, a streaming session with a plurality of viewer systems 120A, 120B, and 120C through a streaming system 115 as described above. Conducting of the streaming session can comprise receiving media content from a plurality of input devices such as a camera 225 and/or a microphone 230 coupled with the processor 205 via the bus 260 and providing the media content and game play information 245 of to the streaming system 115 through the communication interface(s) 210. The streaming manager instructions 250 can also cause the processor 205 to receive, through the communications interface(s) 210, during the conducting of the streaming session, an indication of an action by a user of one of the viewer systems 120A, 120B, and 120C. The action can indicate a transfer of value from an electronic record associated with the user of the one of the viewer systems to an electronic record associated with the player of the gaming system 105A. For example, the transfer of value can comprise a transfer of monetary value from the user of the one of the viewer system to the player.

The memory 235 can also store, and the processor 205 can execute, a set of streaming user interface instructions 255. When executed by the processor 205, the streaming user interface instructions 255 can cause the processor 205 to provide, through the display 215 and/or speaker(s) 220, an indication of the action by the user of the viewer system and the transfer of value. For example, providing the indication of the action by the user of the viewer system and the transfer of value can comprise providing an overlay on a user interface presented in the display 215. The overlay can present the indication of the transfer of value. According to one embodiment, the streaming user interface instructions 255 can also cause the processor 205 to conduct a chat session between the player and users of the viewer systems allowing the viewers to interact with the player, e.g., through video and/or text-based chat.

As noted above, the transfer of value from the viewer to the player may be conditional depending upon the outcome of the game. Accordingly, the set of streaming user interface instructions 255 can cause the processor 205 to provide a notification of the transfer through the display 215 and/or speaker(s) 220 based on the outcome of the game as indicated by the game play instructions 240 and/or game play information 245. Additionally, or alternatively, the set of streaming manager instructions 250 can further causes the processor 205 to provide a notification of an outcome of the game in the stream to the viewers, i.e., through the communication interface(s) to the streaming system 115.

Figure 3:
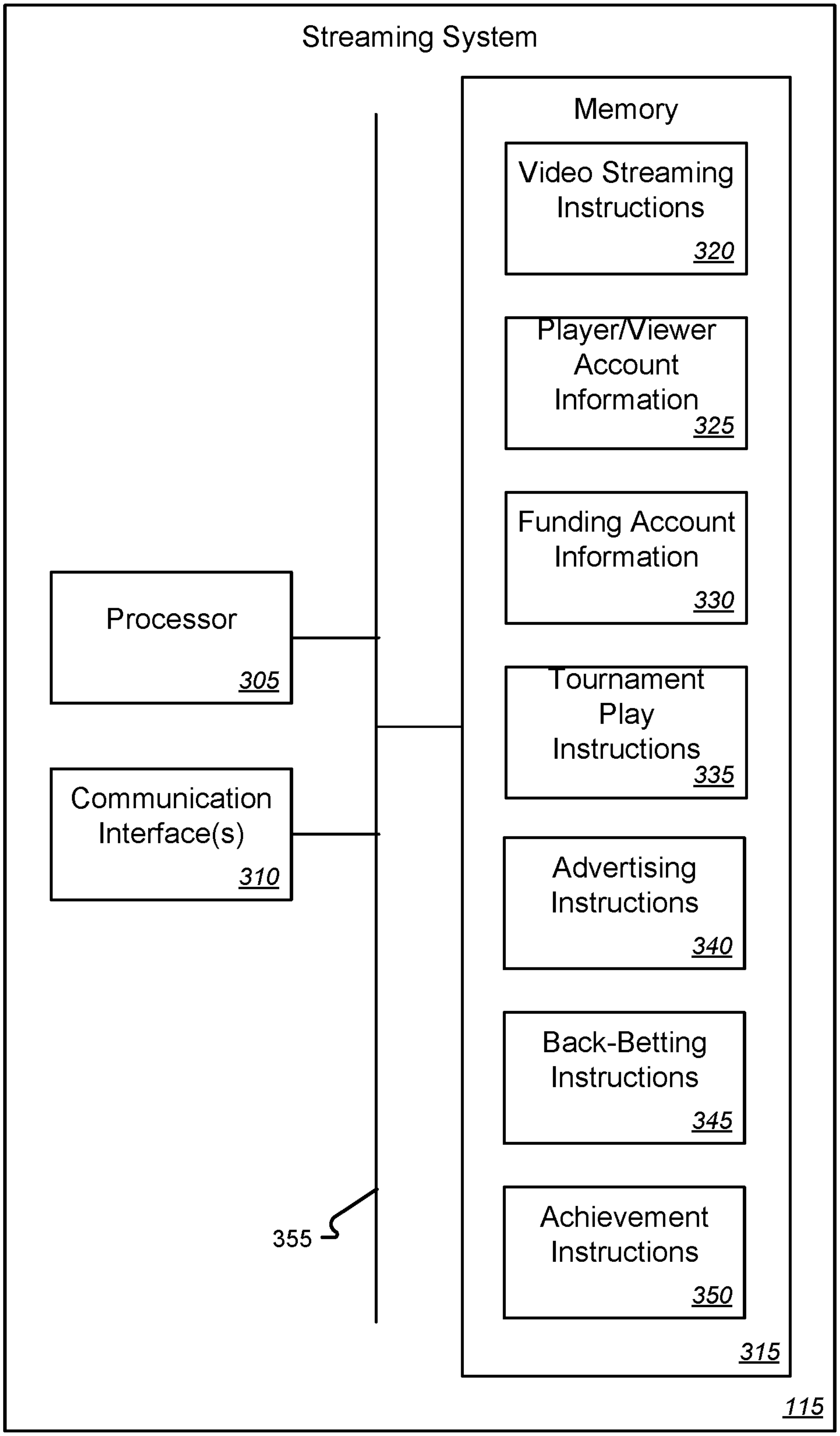
FIG. 3 is a block diagram illustrating additional details of an exemplary streaming system according to one embodiment of the present disclosure.

FIG. 3 is a block diagram illustrating additional details of an exemplary streaming system 115 according to one embodiment of the present disclosure. As illustrated in this example, a streaming system 115 can comprise a processor 305 such as any of the various types of processors described above. A memory 315 can be coupled with and readable by the processor 305 via a communications bus 355. The memory 315 can comprises any one or more of the different types of volatile and/or non-volatile memories described above. The processor 305 can also be coupled with one or more communication interfaces 310. The communication interfaces 310 can comprise, for example, any one or more of a variety of wired and/or wireless interfaces to one or more LANs and/or WANs, such as an Ethernet network, a Token-Ring network and/or the like, a virtual network, including without limitation a Virtual Private Network (VPN), the Internet, an intranet, an extranet, a Public Switched Telephone Network (PSTN), an infra-red network, a wireless network (e.g., a network operating under any of the IEEE 802.9 suite of protocols, the Bluetooth® protocol known in the art, and/or any other wireless protocol); and/or any combination of these and/or other networks.

The memory 315 can store therein sets of instructions which, when executed by the processor 305, cause the processor 305 to conduct live streaming of video, audio and/or other media between a gaming system 105A and one or more viewer systems 120A, 120B, and 120C as described above. More specifically, the memory can have stored therein a set of video streaming instructions which, when executed by the processor 305, cause the processor 305 to establish, through the communications interface(s) 310, a streaming session between a first gaming system 105A and a plurality of viewer systems 120A, 120B, and 120C. As noted, the streaming session can comprise an exchange of media between the first gaming system 105A and the plurality of viewer systems 120A, 120B, and 120C. According to one embodiment, the memory 315 can also store a set of player and/or viewer account information 325. This account information 325 can comprise user information for players and/or viewers registered with the streaming system 115 and can be used by the processor 305 when executing the video streaming instructions 320 to identify, authenticate, and/or authorize the player and/or viewers when they access the streaming system 115 during establishment of the streaming session.

The video streaming instructions 320 can further cause the processor 305 to receive, through the communications interface(s) 310, from the first gaming system 105A during the streaming session, game play information of a gambling event, e.g., a game being played on the gaming system 105A, and provide, through the communications interface(s) 310, the game play information to the plurality of viewer systems 120A, 120B, and 120C.

During the streaming session, the video streaming instructions 320 can further cause the processor 305 to receive, through the communications interface(s) 310, an indication of an action by a user of one of the viewer systems 120A. The action can indicate a transfer of value from an electronic record associated with the user of the one of the viewer systems 120A to an electronic record associated with a user of the first gaming system 105A. For example, and according to one embodiment, the memory 315 may further comprise a set of funding account information 330. This information 330 can comprise electronic records representing previously funded accounts for the viewers 125A, 125B, and 125C. The transfer of value can comprise, for example, a transfer of monetary value from the viewer 125A using one of the viewer systems 120A to player 110A of the gaming system 105A who is a participant in the gambling event. Accordingly, the video streaming instructions 320 can further cause the processor 305 to update the electronic record in the funding account information associated with the viewer and perhaps another record associated with the participant in the gambling event and provide, through the communications interface(s) 310, a message to the first gaming system 105A indicating the transfer of monetary value.

According to one embodiment, the memory 315 can also store a set of tournament play instructions 335. When executed by the processor 305, during establishment of the streaming session, the set of tournament play instructions 335 can further cause the processor 305 to establish the streaming session with a second gaming system 105B. In such cases, the streaming session can further comprise an exchange of media between the second gaming system and the plurality of viewer systems and the gambling event can comprise a tournament between the user of the first gaming system 105A and a user of the second gaming system 105B as participants in the tournament.

According to one embodiment, the memory 315 can additionally or alternatively store a set of advertising instructions 340. When executed by the processor 305, the advertising instructions 340 can cause the processor to encode in the stream an advertisement for the casino or venue in which the gaming system 105A and/or 105B is located. For example, this encoding can cause the viewing system 120A, when rendering the stream, to display the base game surrounded by a logo or advertisement from the casino. In another approach, the advertising instructions 340 may provide the advertisement to the viewer system 120A separate from the streaming video. In either case, the advertisement might offer players discounts, free points, or free promotional credits at the casino for signing up for a visit to the casino. Additionally, or alternatively, the advertisement can offer viewers 125A, 125B, and/or 125C who associate their account with the streaming system 115 to a casino player tracking account various privileges based upon how much they watch, how many gifts they give players, or how many back-bets they place.

Additionally, or alternatively, the memory 315 can store a set of back-betting instructions 350. When executed by the processor 305, the back-betting instructions 345 can establish an online wagering account for a viewer, e.g., as a record in the funding account information, with the streaming system 115 and pre-fund the account with credits. The back-betting instructions 345 can then cause the processor 305 receive a bet from the viewer using this pre-funded account. If the player 110A does not win a game cycle or wager, then the online viewer 125A also loses and the back-betting instructions 345 can decrement the value of the account. If the player 110A wins, then the viewer 125A who was betting along with the player 110A can also win the same amount and the back-betting instructions 345 can increment the viewers account accordingly.

According to one embodiment, the memory 315 can additionally or alternatively store a set of achievement instructions 350. When executed by the processor 305, the achievement instructions 350 can cause the processor 305 to track player achievements on the streaming system 115 for their play and make awards such as badges, avatars, access to emojis, prizes, e.g., cash or physical goods, etc. Game outcome data tracked by the achievement instructions 350 can comprise of the wager and the win, i.e., zero or above, but more detailed data can be sent as well. For example, outcome data for a hand of video poker can describe the hand dealt, the cards held, and the final hand.

Figure 4:
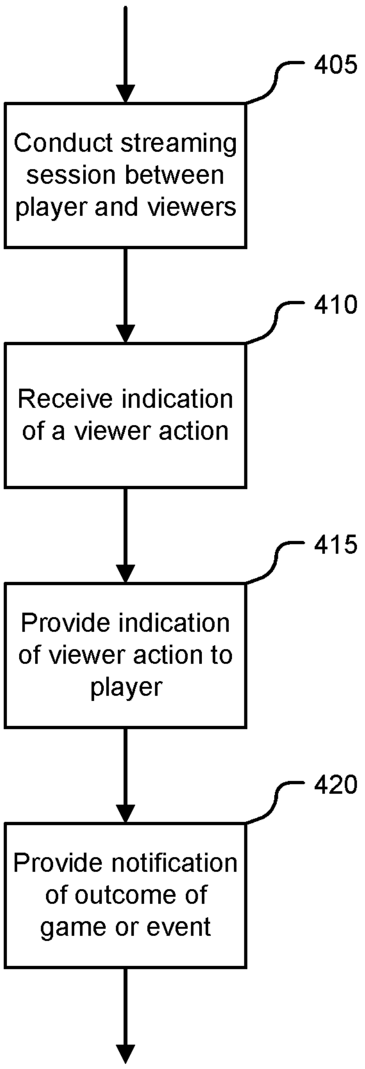
FIG. 4 is a flowchart illustrating an exemplary process for streaming of video, audio and/or other media from a gaming system to a set of viewers according to one embodiment of the present disclosure.

FIG. 4 is a flowchart illustrating an exemplary process for streaming of video, audio and/or other media from a gaming system to a set of viewers according to one embodiment of the present disclosure. More specifically, this example illustrates processes as may be performed by a gaming system 105A or 105B as described above. As illustrated in this example, streaming of video, audio and/or other media from a gaming system to a set of viewers can begin with conducting 405 a streaming session with a plurality of viewer systems through a streaming system. The conducting 405 of the streaming session can comprise receiving media content from a plurality of input devices, such as a camera, microphone, etc., and providing the media content and game play information of a gambling event, e.g., a game being played on the gaming system, to the streaming system. Conducting 405 the streaming session can further comprise conducting a chat session between the participant in the gambling event and users of the plurality of viewer systems.

During the conducting 405 of the streaming session receive, an indication of an action by a user of one of the viewer systems can be received 410. The action can comprise a transfer of value from an electronic record associated with the user of the one of the viewer systems to an electronic record associated with a participant in the gambling event and associated with the gaming system. The transfer of value from the electronic record associated with the user of the one of the viewer systems to the electronic record associated with the participant in the gambling event can comprise a transfer of monetary value from the user of the one of the viewer systems to the participant in the gambling event.

An indication of the action by the user of the one of the viewer systems and the transfer of value from the electronic record associated with the user of the one of the viewer systems to the electronic record associated with the participant in the gambling event can be provided 415 through the display of the gaming system. For example, providing 415 the indication of the action by the user of the one of the viewer systems and the transfer of value from the electronic record associated with the user of the one of the viewer systems to the electronic record associated with the participant in the gambling event can comprise providing an overlay on a user interface presented in the display. The user interface can present the game play information to the participant in the gambling event and the overlay presenting the indication of the transfer of value from the electronic record associated with the user of the one of the viewer systems to the electronic record associated with the participant in the gambling event.

According to one embodiment, the transfer of value can be conditional depending upon the outcome of the gambling event. In such cases, a notification a notification of the transfer of value to the participant in the gambling event can be provided 420 to the player based on the outcome of the gambling event. Providing 420 the notification of the outcome of the gambling event can also include providing a notification of the outcome of the gambling event to each of the plurality of viewer systems.

Figure 5:
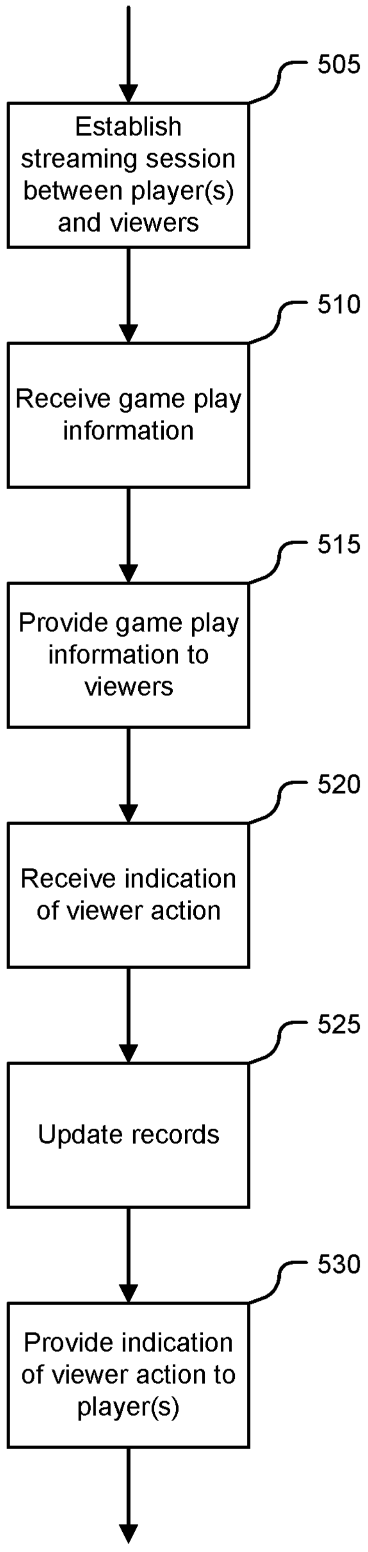
FIG. 5 is a flowchart illustrating an exemplary process for providing a streaming session between a player of a gaming system and a set of viewers according to one embodiment of the present disclosure.

FIG. 5 is a flowchart illustrating an exemplary process for providing a streaming session between a player of a gaming system and a set of viewers according to one embodiment of the present disclosure. More specifically, this example illustrates processes as may be performed by a streaming system 115 as described above. As illustrated here, providing a streaming session between a player of a gaming system and a set of viewers can comprise establishing 505 the streaming session between a first gaming system and a plurality of viewer systems. The streaming session can comprise an exchange of media between the first gaming system and the plurality of viewer systems. In some cases, establishing 505 the streaming session can further comprise establish the streaming session with a second gaming system and, the streaming session can further comprise an exchange of media between the second gaming system and the plurality of viewer systems. For example, the gambling event can comprise a tournament, and the user of the first gaming system and a user of the second gaming system can be participants in the tournament.

During the streaming session, game play information of the gambling event can be received 510, e.g., from the first gaming system and the received game play information can be provided 515 to the plurality of viewer systems. Also, during the streaming session, an indication of an action by a user of one of the viewer systems can be received 520. The action can comprise a transfer of value from an electronic record associated with the user of the one of the viewer systems to an electronic record associated with a user of the first gaming system. For example, the transfer of value from the electronic record associated with the user of the one of the viewer systems to the electronic record associated with the participant in the gambling event can comprise a transfer of monetary value from the user of the one of the viewer systems to the participant in the gambling event. Accordingly, an electronic record associated with the participant in the gambling event can be updated 525 based on the transfer and an indication of the action by the user of the one of the viewer systems can be provided 530 to the player through the first gaming system.

Figure 6:
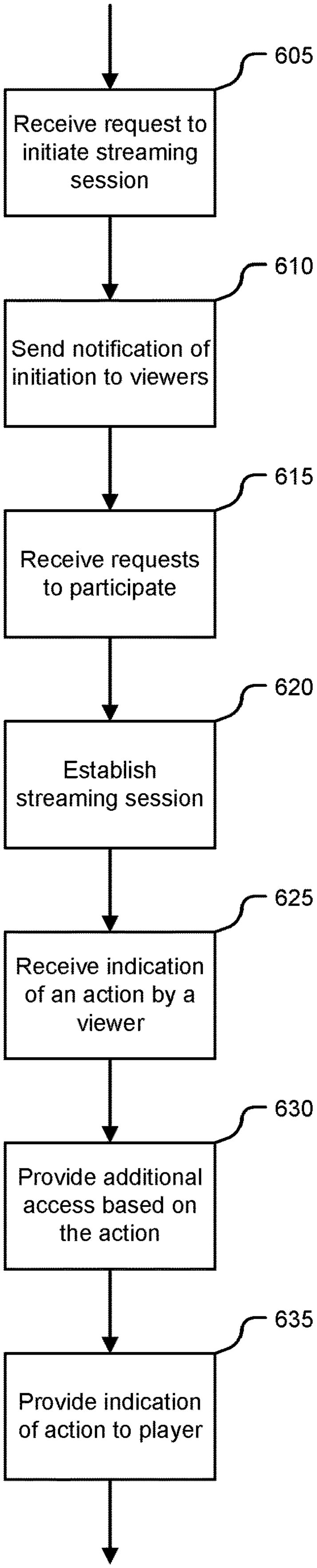
FIG. 6 is a flowchart illustrating an exemplary process for providing a streaming session between a player of a gaming system and a set of viewers according to another embodiment of the present disclosure.

FIG. 6 is a flowchart illustrating an exemplary process for providing a streaming session between a player of a gaming system and a set of viewers according to another embodiment of the present disclosure. As illustrated in this example, conducting a streaming session related to a gambling event can comprise receiving 605, by a streaming system through a communications network, a request from an Electronic Gaming Machine (EGM) to initiate the streaming session. A message can then be sent 610 to each of a plurality of viewer systems. The message can comprise a notification of initiation of the streaming session. According to one embodiment, each viewer system of the plurality of viewer systems to which the message is sent can be associated with a subscriber to a group associated with a user of the EGM.

A message from a viewer system of the plurality of viewer systems requesting participation in the streaming session can be received 615 and the streaming session can be established 620 between the EGM and the viewer system. The streaming session can comprise an exchange of media between the EGM and the viewer system and game play information of a game executing on the EGM.

During the streaming session, an indication of an action by a user of one of the viewer systems can be received 625. The action can indicate a transfer of value from an electronic record associated with the user of the one of the viewer systems to an electronic record associated with a user of the EGM. For example, the transfer of value can comprise a transfer of game play credits to the EGM. In some cases, a result of the game executing on the EGM can be shared between the user of the EGM and the user of the viewer system based on the transfer of value. Additionally, or alternatively, the transfer of value may modify an outcome of the game executing on the EGM. According to one embodiment, additional access can be provided 630 based on the transfer. For example, in response to the transfer of value, at least a portion of the media exchanged in the streaming session to a social media system maintaining a social media account for the user of the one of the viewer systems. In any of these cases, an indication of the action by the user of one of the viewer systems can be provided 635 to the first gaming system.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method for conducting a streaming session related to a gambling event, the method comprising:

receiving, by a processor of a streaming system, through a communications network, an electronic message comprising a request from an Electronic Gaming Machine (EGM) to initiate the streaming session;

sending, by the processor of the streaming system, through the communications network, an electronic message to each of a plurality of viewer systems, the electronic message comprising a notification of initiation of the streaming session;

receiving, by the processor of the streaming system, from a viewer system of the plurality of viewer systems, an electronic message requesting participation in the streaming session;

establishing, by the processor of the streaming system, the streaming session between the EGM and the viewer system, the streaming session comprising an exchange of media between the EGM and the viewer system and game play information of a game executing on the EGM, and wherein establishing the streaming session comprises combining the media and the game play information and encoding the combined media and game play information into the streaming session;

receiving, by the processor of the streaming system, through the communications network and during the streaming session, an electronic message comprising an indication of an action by a user of one of the viewer systems; and providing, by the processor of the streaming system, through the communications network, to a first gaming system, an electronic message comprising an indication of the action by the user of one of the viewer systems.

2. The method of claim 1, wherein each viewer system of the plurality of viewer systems is associated with a subscriber to a group associated with a user of the EGM.

3. The method of claim 1, wherein the action indicates a transfer of value from an electronic record associated with the user of the one of the viewer systems to an electronic record associated with a user of the EGM.

4. The method of claim 3, further comprising providing, by the processor of the streaming system, through the communications network and in response to the transfer of value, at least a portion of the media exchanged in the streaming session to a social media system maintaining a social media account for the user of the one of the viewer systems.

5. The method of claim 3, wherein a result of the game executing on the EGM is shared between the user of the EGM and the user of the viewer system based on the transfer of value.

6. The method of claim 3, wherein the transfer of value comprises a transfer of game play credits to the EGM.

7. The method of claim 3, wherein the transfer of value modifies an outcome of the game executing on the EGM.

8. A streaming system comprising:

a processor; and a memory coupled with and readable by the processor and storing therein a set of instructions which, when executed by the processor, causes the processor to:

receive, by the processor, through a communications network, an electronic message comprising a request from an Electronic Gaming Machine (EGM) to initiate the streaming session;

send, by the processor, through the communications network, an electronic message to each of a plurality of viewer systems, the electronic message comprising a notification of initiation of the streaming session;

receive, by the processor, from a viewer system of the plurality of viewer systems, an electronic message requesting participation in the streaming session;

establish, by the processor, the streaming session between the EGM and the viewer system, the streaming session comprising an exchange of media between the EGM and the viewer system and game play information of a game executing on the EGM, and wherein establishing the streaming session comprises combining the media and the game play information and encoding the combined media and game play information into the streaming session;

receive, by the processor, through the communications network and during the streaming session, an electronic message comprising an indication of an action by a user of one of the viewer systems; and provide, by the processor, through the communications network, to a first gaming system, an electronic message comprising an indication of the action by the user of one of the viewer systems.

9. The streaming system of claim 8, wherein each viewer system of the plurality of viewer systems is associated with a subscriber to a group associated with a user of the EGM.

10. The streaming system of claim 8, wherein the action indicates a transfer of value from an electronic record associated with the user of the one of the viewer systems to an electronic record associated with a user of the EGM.

11. The streaming system of claim 10, further comprising providing, by the processor, through the communications network and in response to the transfer of value, at least a portion of the media exchanged in the streaming session to a social media system maintaining a social media account for the user of the one of the viewer systems.

12. The streaming system of claim 10, wherein a result of the game executing on the EGM is shared between the user of the EGM and the user of the viewer system based on the transfer of value.

13. The streaming system of claim 10, wherein the transfer of value comprises a transfer of game play credits to the EGM.

14. The streaming system of claim 10, wherein the transfer of value modifies an outcome of the game executing on the EGM.

15. A non-transitory, computer-readable medium comprising a set of instructions stored therein which, when executed by the processor, causes the processor to:

receive, by the processor, through a communications network, an electronic message comprising a request from an Electronic Gaming Machine (EGM) to initiate the streaming session;

send, by the processor, through the communications network, an electronic message to each of a plurality of viewer systems, the electronic message comprising a notification of initiation of the streaming session;

receive, by the processor, from a viewer system of the plurality of viewer systems, an electronic message requesting participation in the streaming session;

establish, by the processor, the streaming session between the EGM and the viewer system, the streaming session comprising an exchange of media between the EGM and the viewer system and game play information of a game executing on the EGM, and wherein establishing the streaming session comprises combining the media and the game play information and encoding the combined media and game play information into the streaming session;

receive, by the processor, through the communications network and during the streaming session, an indication of an action by a user of one of the viewer systems; and provide, through the communications network, to a first gaming system, an electronic message comprising an indication of the action by the user of one of the viewer systems.

16. The non-transitory, computer-readable medium of claim 15, wherein the action indicates a transfer of value from an electronic record associated with the user of the one of the viewer systems to an electronic record associated with a user of the EGM.

17. The non-transitory, computer-readable medium of claim 16, further comprising providing, by the processor, through the communications network and in response to the transfer of value, at least a portion of the media exchanged in the streaming session to a social media system maintaining a social media account for the user of the one of the viewer systems.

18. The non-transitory, computer-readable medium of claim 16, wherein a result of the game executing on the EGM is shared between the user of the EGM and the user of the viewer system based on the transfer of value.

19. The non-transitory, computer-readable medium of claim 16, wherein the transfer of value comprises a transfer of game play credits to the EGM.

20. The non-transitory, computer-readable medium of claim 16, wherein the transfer of value modifies an outcome of the game executing on the EGM.

* * * * *